May 6, 1958
D. W. SCOFIELD
2,833,908
ELECTRICAL HEATING UNIT
Filed April 25, 1955
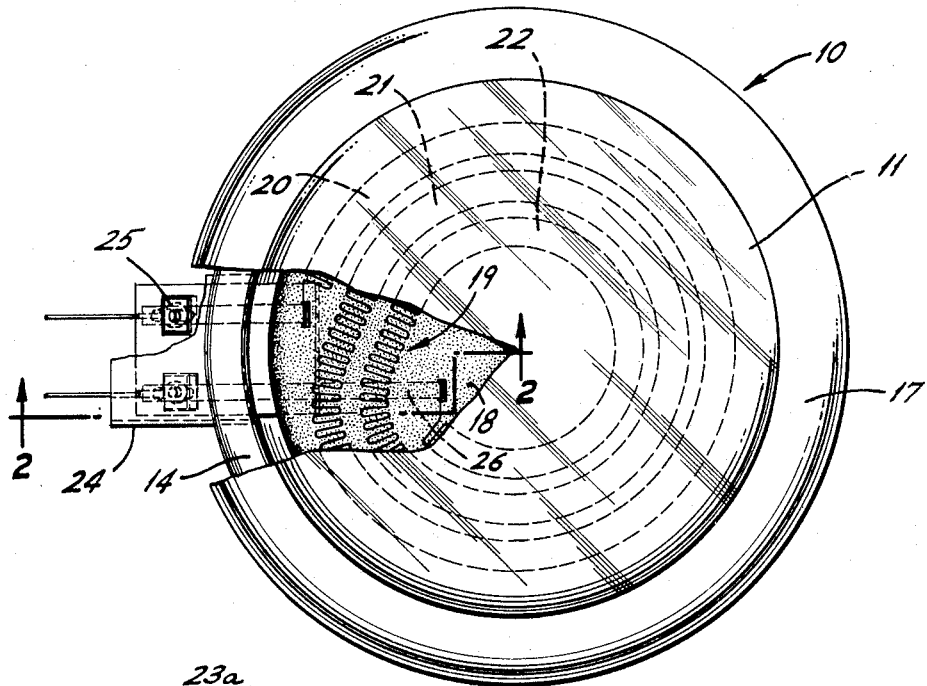
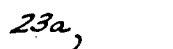
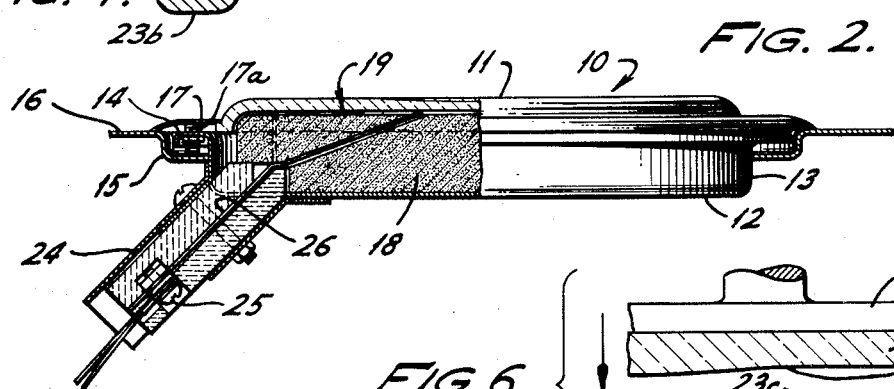
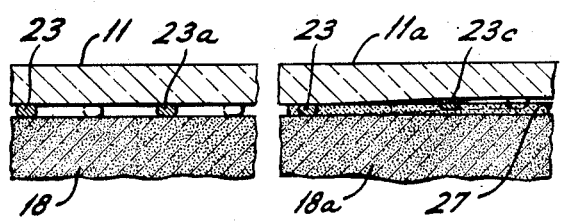
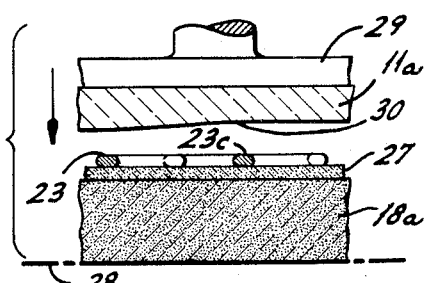
INVENTOR.
DONALD W. SCOFIELD
BY
*Carl H. Synnestvedt*
AGENT

United States Patent Office 2,833,908
Patented May 6, 1958

2,833,908

ELECTRICAL HEATING UNIT

Donald W. Scofield, Glenside, Pa., assignor to Philco Corporation, Philadelphia, Pa., a corporation of Pennsylvania Application April 25, 1955, Serial No. 503,667

8 Claims. (Cl. 219—37)

The invention hereinafter described and claimed relates to heating equipment and, more particularly, to heating units having especial adaptability as surface cooking elements in electric ranges.

It is common in present day electric range practice to provide surface heating units which comprise a convoluted metallic sheath of generally tubular cross-sectional shape having enclosed therein an electrically conductive element, said units further being provided with an underlying drain pan which also serves as a reflector.

While such units have proven reliable and are of satisfactory thermal efficiency, they are subject to certain disadvantages. Notably, cleanliness represents a problem with units of this kind, since spillage from a cooking vessel is free to drip through the unit and to collect in the underlying pan. Attempts have been made to overcome this disadvantage by the provision of a heating unit having a flat, substantially imperforate, plate-like surface which can be cleaned by a simple wiping operation. The plates have been made of metal, of ceramic material, and of certain types of glass. However, and in spite of their inherent cleanliness, such units have not met with any considerable degree of success, primarily because they have been of relatively low thermal efficiency, as compared with the aforesaid sheath type units, and by reason of short operating life.

Accordingly, and with the foregoing in mind, it is the general objective of my invention to provide a novel glass plate type heating unit which is composed of such materials and is so fabricated as to have high thermal efficiency, together with reliability and long life.

More specifically, and as compared with plate type heating units which have hitherto been developed, the unit of my invention is characterized by substantial elimination of loss of heat downwardly through the unit, by a high degree of thermal coupling between the imperforate glass plate and the electrical conductor which underlies the same, and by lower operating temperatures in the conductive element, as well as reduction in weight of the assembly.

In one aspect of the invention it is an object to provide a novel method of constructing a high efficiency plate type heating unit.

In achievement of the foregoing general objectives, and first briefly described, my invention contemplates provision of a heating unit comprising a pair of confronting plate-like members, one of said members being of high heat transmissivity and having an upper surface adapted to support a cooking vessel, and the other of said members being disposed beneath said one member and comprising a plate of porous heat insulating material minimizing loss of heat downwardly from the unit.

In particular accordance with the invention, there is provided, between the aforesaid plate-like members, an electrical conductor configured and disposed to have an unusually high degree of thermal contact with the glass, vessel-supporting plate member. In a preferred embodiment this conductor has a plurality of coplanar convolutions arranged to form a spiral, when viewed in plan, and having a flattened cross-sectional configuration, whereby to present substantial area for contact with the lower surface of the glass vessel-supporting plate or member. The lower, porous, insulating member or plate supports the mentioned conductor, and maintains the flattened surface area of the same in intimate contact with the lower surface of the upper glass plate. There results a simple and relatively inexpensive assembly which achieves substantially greater thermal efficiency than has been achieved in previous glass plate type units. It is to be emphasized that the intimate contact between the conductor and the glass plate, which contributes materially to the high efficiency of the unit, also makes it possible to maintain lower temperatures in the coiled conductor, with consequent extention of the life of the unit. In addition to the constructional features mentioned briefly above, the invention presents particular advantages in that the unit may include means positively preventing movement of portions of the electrical conductor toward and into contact with adjacent portions. "Excursions" of the conductor have represented a substantial problem in many of the glass plate type units hitherto proposed.

A preferred embodiment of the invention, and the best mode of achieving the foregoing and other objects and advantages inherent therein, will be understood from a consideration of the following detailed description taken together with the accompanying drawings, in which:

Figure 1 is a plan view of a plate type electrical heating unit embodying the invention, a portion of the upper glass plate being broken away to facilitate illustration of features of construction;

Figure 2 is a sectional view taken substantially along the line 2—2 of Figure 1;

Figure 3 is a fragmentary sectional view, on an enlarged scale, illustrating the manner in which the electrical conductor is received between the heat transmissive and the non-conductive plate members, and is maintained in intimate contact with the upper heat transmissive member;

Figure 4 is a sectional view on a very much magnified scale, illustrating the cross-sectional configuration of the wire or conductor used in fabricating the spiral heating element;

Figure 5 is a fragmentary sectional view, similar to Figure 3, illustrating a modified embodiment of the invention; and, Figure 6 is a fragmentary, diagrammatic sectional view illustrative of one type of apparatus which may be used in the practice of a novel method for constructing units of the kind shown in Figure 5.

Now with more particular reference to the drawing, and initially to Figures 1 and 2 thereof, the numeral 10 designates, generally, a plate type heating unit of the kind contemplated by this invention, said unit comprising a simple and relatively inexpensive assembly including an upper imperforate plate 11 of glass or similar material which is highly resistant to mechanical impact and thermal shock, and which is of high heat transmissivity. In practice such a plate may be constructed largely of silica (a preferred composition comprises upwardly of 96% silica), glass of this general type having been developed and merchandised under the trade name "Vycor."

Beneath the plate 11 is a metallic dished or pan-like member 12 having an upturned annular flange 13 provided with an outwardly extending ring-like portion 14, adapted to be received within a seat 15 recessed within the upper working surface 16 of the range top. A circular trim member 17 overlies said recessed seat 15 and the flanging 14 which supports the unit therein, said trim member engaging the upper glass plate and carrying studs 17a which fix the glass plate to the flange 14 of the underlying pan 12. As will be recognized, the trim member also prevents access of dirt and moisture to the range areas which underlie the heating unit.

Disposed within the pan-like member 12 is a porous or foraminous plate or disk 18 which closely underlies substantially the entire lower surface of the glass plate 11, said porous disk being fabricated of material of low thermal conductivity, for example foam silica.

It is to be observed that use of the foam silica disk 18 minimizes loss of heat downwardly within the range or other apparatus with which the unit is associated, thereby insuring adequate transfer of heat upwardly to the glass plate, provided that a high degree of thermal coupling is present between the plate and the underlying electrical conductor.

The electrically conductive heating element is illustrated, generally, at 19 in the drawing, and comprises a conductor wire having a large number of minor transverse convolutions lying in a single plane and disposed spirally to form three major convolutions, as is illustrated at 20, 21 and 22, in Figure 1. Importantly, the wire which forms the aforesaid minor and major convolutions is of flattened cross-sectional shape, the wire per se appearing to good advantage in Figure 4, being designated with the reference character 23 in that figure, and having flattened upper and lower surfaces shown at 23a and 23b.

As appears to best advantage in Figure 3, the heating element 19 (comprised of the coiled wire 23) is supported upon the porous sheet or disk 18 and through the agency of this disk, which reacts against the pan-like member 12, the upper flattened surface 23a of all of the convolutions of conductor 23 is held in intimate contact with the lower surface of the glass plate 11. Wire of suitable electrical resistance and cross-sectional configuration can readily be fabricated of a nickel-chromium alloy, for example the alloy known as Nichrome. As will be understood without detailed description, the heating unit includes tubular structure 24 extending outwardly and downwardly from the unit and housing terminal apparatus 25 from which conductors 26 extend upwardly to supply the Nichrome wire of the heating element.

The increase in efficiency which is obtained by utilizing flattened conductor of the kind shown in Figure 4, in combination with the underlying disk or sheet of low thermal conductivity, is very substantial. In applicant's experience this difference in thermal efficiency renders the plate type unit of this invention completely satisfactory from the commercial point of view. The term "thermal efficiency," as used in this art, denotes the ratio of useful energy output divided by the energy consumed by the unit, and determined during a period starting with unit, vessel, and water at 60° F., and ending when the water has reached boiling temperature. This method of rating is defined by ASA Standards No. C71.1, 1950.

In a variety of previous plate type units of which I am aware, efficiency has ranged from about 50%, to about 60%, whereas an efficiency of the order of 68%, to 72% is readily and consistently attainable with the apparatus of this invention. In large part this high efficiency is attributable to the high degree of thermal coupling which exists between sinuous flattened conductor wire 23 and the overlying heat transmissive glass plate, the notable improvement in thermal coupling being achieved by reason of the extended surface contact between conductor and the glass, throughout the length of the conductor. As hereinbefore mentioned, prevention of loss of heat downwardly through the unit by the use of porous filler or support material, is also a factor of substantial importance.

Maintenance of substantial surface contact between the conductor and the plate has the corollary advantage of achieving, in addition to the high thermal efficiency referred to, lower operating temperatures in the coil conductor, thereby contributing substantially to the life of the unit.

In practice it has been found that, at times, it is difficult to fabricate glass plates having an absolutely flat lower surface. Any material departure from a truly plane surface may interfere with maintenance of the conductor in intimate contact with the plate, and I have also overcome this problem by providing the embodiment of the invention illustrated in Figures 5 and 6. In this embodiment there is interposed, between the foam silica disk 18a and the overlying conductor 23, a refractory material in which the conductor 23 becomes completely embedded, in certain regions underlying the glass plate, and upon which material the conductor may be supported in certain other underlying areas. As shown at 23c in Figure 5, the conductor is only partially embedded in the material illustrated at 27, in areas in which the glass plate is somewhat concave.

Refractory material suitable for this purpose comprises a mortar or filler applied in the plastic state, and having the capability of "setting" or hardening in the presence of heat. A variety of refractory materials are suitable for this purpose, and usually consist of a known plastic refractory granular material and a plasticizing agent such as ball clay. One suitable cement is marketed under the trade name "Alundum."

As is illustrated in Figure 6, my invention contemplates a novel method of manufacturing heating units including such refractory material, the method being particularly characterized by insuring good thermal contact between the coiled conductor and the overlying glass plate, regardless of whether or not all portions of the under surface of the glass plate lie in a common plane. This method comprises providing the upper and lower plates or disks, described hereinbefore, coating the upper surface of the thermally non-conductive lower disk with a suitable plastic refractory material, disposing the coiled conductor upon the said refractory material, and establishing intimate contact between the lower surface of the glass plate and the conductor by bringing the plate and the foam silica sheet into close juxtaposition, and in the presence of considerable pressure.

Simple apparatus for practicing the method is diagrammatically illustrated in Figure 6, and comprises base structure 28 against which the foam silica sheet 18a reacts, together with a head member 29 to which is secured the glass plate 11a. The head member is mounted for movement toward the base structure 28. As the head member moves downwardly, contact is first made with those convoluted portions of the conductor which underlie parts of the plate 11a having maximum extension from the head member 29. One such convolution is shown at 23 in Figure 6 and, by comparison with the showings of Figure 5, it will be seen that said convolution 23 becomes embedded in the refractory cement, only the top portion of the conductor in this region extending to the upper surface of the material 27 and making contact with the lower surface of the glass plate 11a. In another region of the glass plate—a somewhat concave right hand region 30, having lesser extension from the plane lower surface of head member 29—the particular convolution shown at 23c becomes only partially embedded in the refractory cement (see Figure 5) projecting above the cement sufficiently far to make good contact with the mentioned concave area of the glass plate 11a. By using this technique all parts of the conductor are maintained in intimate thermal contact with the under surface of the glass plate, regardless of whether or not said plate is perfectly plane.

After the unit has been fabricated, in the manner set forth above, the unit is baked at a temperature sufficiently high to drive off moisture and to harden the refractory material.

In units of the kind contemplated by this invention, difficulty has occasionally been encountered due to movement or "excursion" of the convolutions of the conductor 23, such excursions resulting from expansion of the conductor in the presence of heat. In some instances portions of the conductor have been short circuited, with resultant damage to the unit. This difficulty is completely overcome by use of the embodiment shown in Figures 5 and 6, in which embodiment the refractory material acts not only to insure proper thermal contact between the conductor and the overlying glass plate, as described above, but also serves as means preventing relative movement of the various convolutions of the conductor which comprises the heating element, thereby completely overcoming the excursion problem.

From the foregoing description it will be understood that the present invention provides a high efficiency, glass plate type, electrical heating unit, and one in which satisfactory efficiency is achieved with lower coil temperatures than have hitherto been feasible, thereby increasing the life of the unit. It is recognized that certain glass type units have been proposed and patented heretofore. However these have been unsatisfactory because of low efficiency and short life. In the prior art arrangements it has been common to recess the conductor within grooves formed in the under surface of the glass plate. The grooves were frequently substantially semi-circular in cross-section, and a conductor of circular cross-section was used therewith. In a unit of this kind, however, it was found that it was not possible to maintain the groove and conductor dimensions within the tolerances required for satisfactory thermal contact. If the conductor was made somewhat oversize as compared with the size of the recess, and forced within the latter, little better than "line contact" was achieved between the conductor and the plate. If, on the other hand, attempts were made to utilize a conductor which would be freely inserted within the grooves, the resultant lost motion was found to interfere with good thermal transfer. These difficulties were simply and effectively overcome by the use of the flat coil contemplated by this invention, in novel combination with an ungrooved glass plate of high heat transmissivity, and in conjunction with an underlying support member of low thermal conductivity which maintains the conductor in intimate contact with the plate.

I claim as my invention:

1. An electrical heater comprising: a plate of electrically insulating, thermally conductive, heat shock resistant material, having a substantially flat, normally downwardly facing lower surface; an elongated and convoluted heating element of electrically conductive material, substantially all portions of the convolutions of said element lying in a plane parallel with said lower surface, and substantially the entire length of the convolutions of said element being in direct contact with said lower surface, in said plane; a body of thermally and electrically insulating material, underlying the plate and element and having a substantially upwardly facing upper surface in contact with said element; and means for pressing said element between said lower and upper surfaces to maintain said contact of the element with the plate, substantially without "excursions" of the heating element relative to the plate.

2. An electrical heater as described in claim 1 wherein the elongated heating element has a substantially continuous and substantially flat surface in direct contact with said plate.

3. An electrical heater as described in claim 2 wherein the elongated heating element has major convolutions in the plane parallel to the lower surface of said plate and also has minor convolutions, in each major convolution, all of said convolutions lying in said plane.

4. An electrical heater comprising: a plate of high silica glass having an upper side adapted to support a cooking vessel and having a downwardly facing lower surface; a body of electrically and also thermally insulating material, having an upper surface substantially upwardly facing, parallel to and co-extensive with the lower surface of said plate; an elongated metallic heating element disposed between the upper surface of said body and the lower surface of said plate and maintained in direct contact with said surfaces substantially throughout the extent of the element; and means for maintaining said direct contact by clamping said element between said body and said plate.

5. An electrical heater as described in claim 4 wherein said body of insulating material comprises a layer of refractory material wherein said heating element is partially embedded, and a plate of silica foam supporting said refractory material.

6. An electrical heater comprising a plate of electrically insulating but thermally conductive material having an approximately plane, substantially downwardly facing lower surface; an elongated, convoluted, metallic heating element in direct contact with said lower surface substantially throughout the extent of said element; a first underlying body, formed of electrically insulating material and having a substantially smooth upper surface, in direct contact with substantially the entire lower surface of the heating element; a second underlying body, supporting the first body and consisting of thermally insulating material; and means for keeping said plate, said heating element, and said underlying bodies clamped together.

7. An electrical heater as described in claim 6 wherein said second underlying body is rigid and porous.

8. In the art of fabricating heaters, a method of establishing extended surface contact between an elongated heating element and a plate-like heater member, which method comprises providing a body having at least a surface portion of plastic material; pressing the elongated heating element, by force applied through the agency of the plate-like member, into the plastic material so as to conform the element to a surface of the plate-like member; solidifying the plastic material after the pressing and conforming operation; and securing the plate-like member, the element and the insulating body together, with the element pressed into the subsequently solidified plastic material and contacted by the plate-like member.

References Cited in the file of this patent

UNITED STATES PATENTS

| | | |
|---|---|---|
| 1,260,252 | Apfel | Mar. 19, 1918 |
| 1,398,410 | Wiegand | Nov. 29, 1921 |
| 1,613,426 | Wiegand | Jan. 4, 1927 |
| 1,945,742 | Hilger | Feb. 6, 1934 |
| 2,152,126 | Young | Mar. 28, 1939 |
| 2,164,650 | Goldthwaite | July 4, 1939 |
| 2,345,300 | Simpson et al. | Mar. 28, 1944 |
| 2,403,022 | Reimers | July 2, 1946 |
| 2,409,244 | Bilan | Oct. 15, 1946 |
| 2,511,540 | Osterheld | June 13, 1950 |